June 12, 1945.                S. RUBEN                2,378,160
DIELECTRIC
Filed Oct. 22, 1941

INVENTOR.
Samuel Ruben
BY
ATTORNEY

June 12, 1945.  S. RUBEN  2,378,160

DIELECTRIC

Filed Oct. 22, 1941

INVENTOR.
Samuel Ruben
BY
ATTORNEY

Patented June 12, 1945

2,378,160

UNITED STATES PATENT OFFICE 2,378,160

DIELECTRIC

Samuel Ruben, New Rochelle, N. Y.

Application October 22, 1941, Serial No. 415,999

9 Claims. (Cl. 260—36)

This invention relates to an electrostatic condenser and dielectrics therefor.

An object of the invention is to improve electrostatic condensers and dielectrics therefor.

Another object is to improve dielectric impregnating materials and provide a dielectric which is homogeneous and non-separating and which can be readily impregnated into the spacer of an electric condenser.

Other objects of the invention will be apparent from the following description taken in connection with the appended claims.

The present invention comprises the combination of elements, methods of manufacture, and the product thereof brought out and exemplified in the disclosure hereinafter set forth, the scope of the invention being indicated in the appended claims.

While a preferred embodiment of the invention is described herein, it is contemplated that considerable variation may be made in the method of procedure and the combination of elements without departing from the spirit of the invention.

Figure 1:
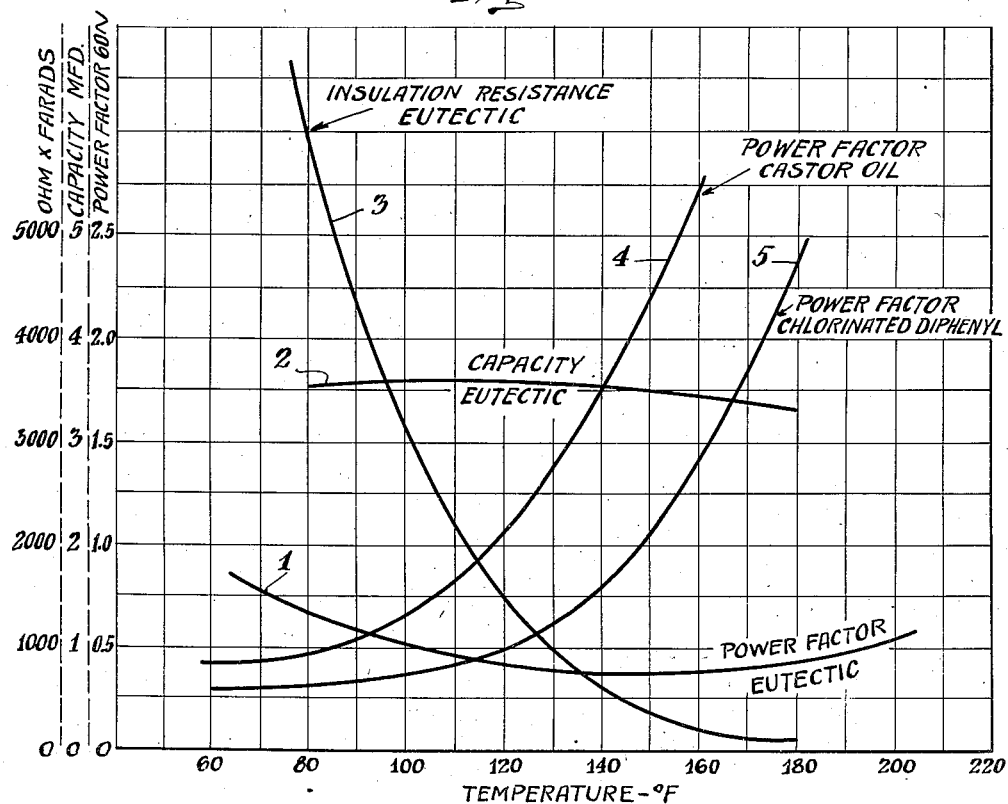
Figure 3:
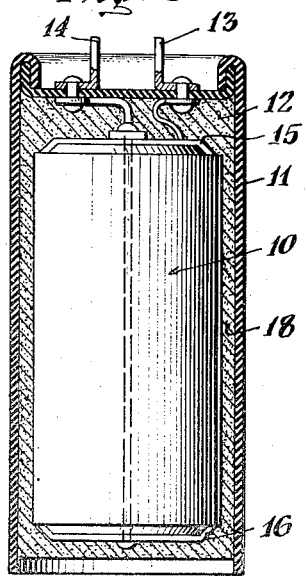
Figure 2:
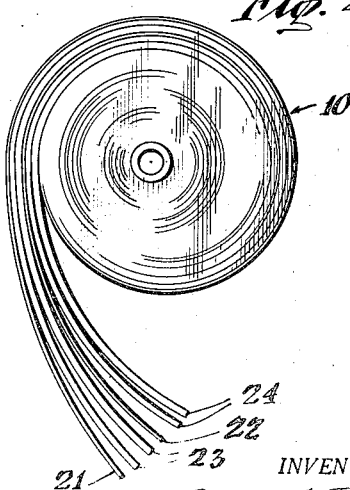
Figure 1:
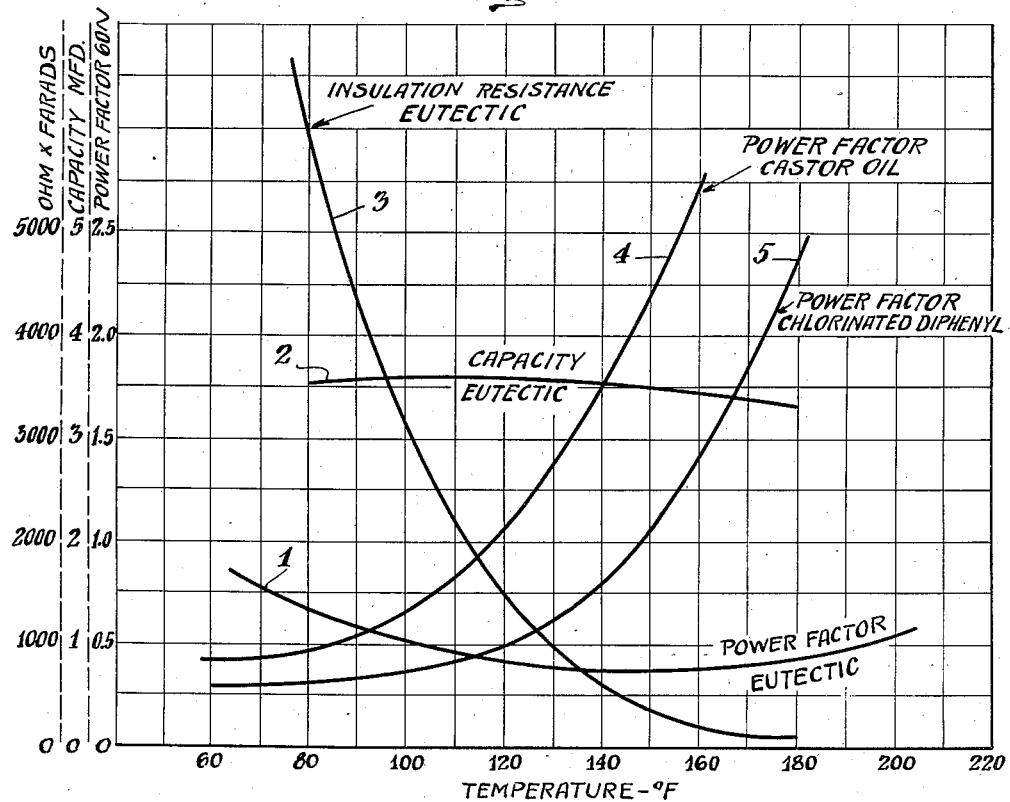
Figure 3:
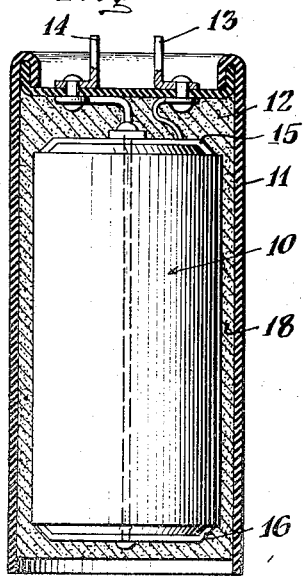
Figure 2:
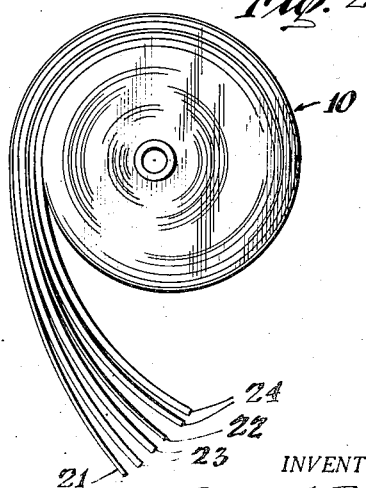

In the drawing: Figure 1 is a graph containing curves of the capacity, power factor and insulation resistance of a condenser embodying features of the present invention and curves for comparison showing the power factor of certain condensers of the prior art; and Figures 2 and 3 illustrate a condenser embodying the present invention.

A desirable dielectric material for impregnation into a porous spacer of an electrostatic condenser should preferably have a high dielectric constant, low power factor, high insulation resistivity, high voltage breakdown and should be non-inflammable, but in addition to these desirable features it is necessary that the dielectric material have a low viscosity at impregnation temperatures.

Many condenser applications require that the condenser operate steadily for long periods on alternating current circuits. It is necessary under these conditions that the condensers be stable under high operating temperatures. The power factor-temperatures coefficient plays an important part since it is obvious that with a positive coefficient the power factor will increase as the temperature rises due to heat developed in the condenser during operation. As the power factor increases, the heat developed due to power factor losses obviously also increases resulting in a runaway characteristic which must be allowed for by using a sufficiently over-size condenser for the application contemplated. Most dielectric materials of comparable dielectric constant which have been used heretofore, such as castor oil and chlorinated diphenyl exhibit such positive coefficients of power factor versus temperature.

Purified coal tar resins such as coumarone, indene, cyclopentadiene and mixtures of these resins exhibit excellent high voltage breakdown characteristics and have been proposed as condenser dielectric materials. However, it is necessary to use the high polymeric forms of these resins to obtain a suitably low power factor and high voltage breakdown. The higher polymeric forms, however, also have a high melting point. In order to utilize these materials for impregnating condensers, it has therefore been necessary to add liquid materials to lower the melting point and reduce the viscosity of the composition when heated to impregnating temperatures so that thorough impregnation of the porous condenser spacer may be achieved. Chlorinated benzene ring compounds are examples of such plasticizing liquid materials and, where high dielectric constant is not required, mineral oils can be used.

During impregnation the more volatile components of the liquid plasticizers tend to distill out of the mixture rendering the remaining dielectric material too viscous for proper impregnation and changing its composition especially when vacuum impregnation is used, as is usually the case.

When vegetable oils are combined with the resin, there is a tendency to produce emulsions rather than solutions, such mixtures tending to separate on standing, resulting in a non-homogeneous dielectric. Oils, such as linseed, tung and castor oil, also tend to oxidize and their dielectric properties deteriorate.

One of the major drawbacks of dielectrics of this type, comprising a resin and a liquid plasticizer, is that they exhibit power factor versus temperature curves having definite peaks at certain temperatures. The maximum value of power factor (where the curve has a peak) is dependent upon the melting point of the mixture and this in turn depends upon the amount of plasticizer present. In formulating such dielectric compositions, therefore, it is desirable that the percentage of plasticizer be adjusted to bring the power factor peak outside the normal operating temperature range of the condenser. This often conflicts with the requirement that the dielectric shall have the requisite low viscosity at impregnating temperatures.

I have now found a means for overcoming these prior difficulties and produced a dielectric material which is heat stable, has a high dielectric constant, and can be vacuum impregnated without separation. My dielectric material preferably comprises an eutectic mixture of coumarone-indene or coumarone-indene-cyclopentadiene resin with ethyl pentachlorbenzene

The purified, heat-polymerized form of resin is by far the best and is used in the preferred embodiment of my invention. It is also contemplated that, if desired, the resin may be further stabilized by hydrogenation.

This preferred resin is made by heat-polymerizing a crude naphtha which contains predominantly dicyclopentadiene, indene and coumarone. The general characteristics of the crude naphtha used in one process is as follows:

| | |
|---|---|
| Boiling range_____deg. C__ | 164–198 |
| Specific gravity_____ | 0.97–0.99 |
| Dicyclopentadiene_____per cent__ | 60–65 |
| Indene _____do____ | 15–20 |
| Coumarone _____do____ | 5–10 |
| Naphthalene up to _____do____ | 2 |
| Molecular weight_____ | 120–130 |
| Aniline point_____deg. C__ | 26–27 |

This naphtha is heated to a temperature between 200 and 260 deg. C. for several hours which allows rapid polymerization. Unreacted material and the lower polymers are subsequently removed from the polymerized mass by combined steam and vacuum distillation. The average molecular weight of the resulting resin (about 500) has indicated that the most probable composition is a mixture of cyclopentadiene octamers, coumarone and indene tetramers and a small quantity of dimeric polymers which influence the melting point.

If the material is hydrogenated, its qualities are improved. Generally, it can be used in the preparation of dielectrics of this invention in the same proportions as the unhydrogenated form. The process of hydrogenation of the resin is well-known and comprises reacting the polymerized material with hydrogen under pressure with heat and sometimes with a catalyst.

Ethyl pentachlorbenzene is a white crystalline solid having a melting point of 57 deg. C. and a boiling point of 305 deg. C. The dielectric may be produced by melting pure ethyl pentachlorbenzene containing not more than 5% impurities or other materials, such as ethyl tetrachlorbenzene, and the coumarone-indene-cyclopentadiene resin together in eutectic proportions. A temperature of 125° C. is sufficient to melt the ingredients and form a clear homogeneous liquid which, on cooling, remains a thick viscid liquid at room temperature instead of returning to a solid crystalline or brittle resin as were both constituents. The eutectic mixture occurs only within a certain range of percentage, namely between approximately 42% and 52% by weight of the coumarone-indene-cyclopentadiene resin in the mixture. Between these percentages, a homogeneous viscid liquid dielectric is produced. The composition will not separate under conditions of alternating current operation at commercial voltages such as 110 or 220 volts, and is stable, waterproof and substantially non-inflammable.

Due to the fact that there are several resin constituents in the dielectric mixture an exact eutectic point is not distinguishable. The material having 45% resin appears to have substantially the lowest viscosity at a given temperature. However, the useful range of compositions extends for some distance to either side of this specific material and within this range the compositions are highly viscid liquids at room temperature rather than crystalline solids. Materials within the useful range may fairly be described as eutectic mixtures.

The mixture can be conveniently formed by grinding the materials to coarse powders and mixing them in the proportions required and then heating the mixture to about 125° C. with continuous stirring until a clear brown liquid mixture is obtained and then allowing the mixture to cool. The resulting eutectic mixture remains a very viscid liquid and upon heating becomes a free flowing liquid of low viscosity which penetrates readily into the paper spacers of a wound foil condenser assembly during impregnation.

*Example 1*

A eutectic mixture of 45% purified heat-polymerized coumarone indene-cyclopentadiene resin and 55% ethyl pentachlorbenzene is produced in the manner described. This dielectric has the lowest viscosity of the compositions within the range referred to above. It will be appreciated, however, that the particular percentage composition which yields a dielectric of minimum viscosity depends in part upon the degree of polymerization of the coal tar resin used. This eutectic mixture has a dielectric constant of about 4.05. Its specific gravity is about 1.4.

*Example 2*

A mixture of 50% purified heat polymerized coumarone - indene - cyclopentadiene resin and 50% ethyl pentachlorbenzene is produced in the same manner. This mixture is homogeneous but is substantially hard at room temperatures. A higher impregnation temperature is required. The electrical properties are very similar.

Mixtures removed in proportional composition from the range contemplated by the present invention are generally poorly suited for condenser dielectric purposes. They crystallize badly when cold, forming a hetrogeneous structure of poor electrical character and low electric breakdown strength.

The accompanying graph of Figure 1 illustrates the electrical characteristics of the dielectric material when used in a condenser. The curves relate to a wound aluminum foil condenser spaced with kraft paper and impregnated with a dielectric composition consisting of 45% of the heat polymerized coumarone-indene-cyclopentadiene having a melting point of 120° C. and 55% of the ethyl pentachlorbenzene. Curve 1 shows the change in the power factor at 60 cycles of the material with increasing temperature and illustrates that the power factor decreases as the temperature rises within the normal operating temperature range encountered in operation on alternating current systems, such as in capacitor motor circuits and for fluorescent lamp phase displacement purposes. This curve also shows the absence of power factor peaks such as occurs with liquid plasticized dielectrics. Curve 2 shows the capacity of the condenser at various temperatures indicating very little change of capacity with temperature. Curve 3 shows the insulation resistance of the material in the condenser. Curves 4 and 5 illustrate for comparison the increasing power factor versus temperature curves for condensers impregnated with castor oil and chlorinated diphenyl respectively.

The condenser can be formed as illustrated in Figure 2 by rolling together a pair of thin metal foils 21 and 22, such as aluminum foil, interleaved with double layer sheet spacers 23 and 24 respectively. The sheet spacers may, for example, be kraft paper or they may be processed regenerated cellulose film. After the condenser roll 10 is formed by winding the foils and spacers together in this manner the condenser roll or section 10 may be impregnated with the molten dielectric composition by immersion in the molten mixture at a temperature of about 110° C. A vacuum should be preferably be applied to obtain as low a pressure as is possible to permit thorough impregnation.

Figure 3 of the drawing illustrates a completed condenser unit comprising impregnated condenser section 10 enclosed in a suitable fibre tube 11 and embedded in a moisture repellent insulating pitch or other insulating material 12. The foils 21 and 22 of the condenser section may preferably be wound in offset relation so that foil 21 projects from one end of the roll and foil 22 from the other. Contact is then made with the two foils by contact members 15 and 16 respectively. Contact member 15 is connected by a suitable conductor to a soldering lug or terminal 13 attached to the closure disc closing one end of fibre tube 11. Contact 16 is connected to a similar soldering lug 14 by a conductor which passes through the center of the roll and through an insulating bushing in the center of contact 15. This conductor also serves to draw contacts 15 and 16 against the ends of the roll.

The present invention affords a means of obtaining a condenser of relatively lower volume and better operating characteristics than that afforded by condensers of the prior art.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A dielectric material comprising an eutectic mixture of coumarone-indene-cyclopentadiene resin and ethyl pentachlorbenzene.

2. A dielectric composed of an eutectic mixture of coumarone-indene-cyclopentadiene resin and ethyl pentachlorbenzene.

3. A dielectric material comprising a mixture of 42% to 52% by weight of coumarone-indene-cyclopentadiene resin and the balance substantially all ethyl pentachlorbenzene.

4. A dielectric for condensers composed of a mixture of 42% to 52% by weight of coumarone-indene-cyclopentadiene resin polymer substantially free of deleterious impurities and the balance substantially all ethyl pentachlorbenzene.

5. A dielectric for electric condensers composed of a mixture of approximately 45% by weight of coumarone-indene-cyclopentadiene polymer resin substantially free of deleterious impurities and the balance substantially all ethyl pentachlorbenzene.

6. A dielectric for electric condensers composed of a mixture of approximately 50% by weight of coumarone-indene-cyclopentadiene polymer resin substantially free of deleterious impurities and the balance substantially all ethyl pentachlorbenzene.

7. A dielectric material composed of an eutectic mixture of ethyl pentachlorbenzene and the normally solid polymer of crude naphtha which contains about 60 to 65% dicyclopentadiene, 15 to 20% indene and 5 to 10% coumarone substantially free of deleterious impurities.

8. A dielectric material composed of 42 to 52% by weight of coumarone-indene-cyclopentadiene resin having an average molecular weight of about 500 and comprising the polymer of a crude naphtha containing about 60 to 65% dicyclopentadiene, 15 to 20% indene and 5 to 10% coumarone, and the balance substantially all ethyl pentachlorbenzene.

9. A dielectric element for electrostatic condensers comprising a sheet of porous solid dielectric material and a viscid liquid dielectric held therein and composed of an eutectic mixture of coumarone-indene-cyclopentadiene resin and ethyl pentachlorbenzene.

SAMUEL RUBEN.